United States Patent [19]

Ishii et al.

[11] Patent Number: 4,901,184

[45] Date of Patent: Feb. 13, 1990

[54] TRIP CONTROL APPARATUS OF CIRCUIT BREAKER

[75] Inventors: Kazuhiro Ishii; Yoshihiro Hatakeyama, Kazushi Sato, Akira Takao, all of Fukuyama, Japan

[73] Assignee: Mitsubishi Denki Kabushiki Kaisha, Tokyo, Japan

[21] Appl. No.: 229,719

[22] Filed: Aug. 8, 1988

[30] Foreign Application Priority Data

Sep. 14, 1987 [JP] Japan .......................... 62-140598[U]

[51] Int. Cl.[4] ............................................. H02H 3/24

[52] U.S. Cl. ....................................... 361/86; 361/91; 361/92; 361/187

[58] Field of Search ....................... 361/86, 87, 93, 91, 361/92, 187; 240/662, 663

[56] References Cited

U.S. PATENT DOCUMENTS

| | | | |
|---|---|---|---|
| 3,749,944 | 7/1973 | Luebrecht | 361/92 |
| 4,061,518 | 4/1977 | Lang et al. | 325/20 |
| 4,126,889 | 11/1978 | Ibamoto et al. | 361/92 |
| 4,163,271 | 7/1979 | Sturrock | 361/93 |
| 4,270,156 | 5/1981 | Fry | 361/92 X |

FOREIGN PATENT DOCUMENTS 57-1041 1/1982 Japan .

*Primary Examiner*—Derek S. Jennings
*Attorney, Agent, or Firm*—Burns, Doane, Swecker & Mathis

[57] ABSTRACT

When a voltage (V) of a D.C. power source having an internal resistance (*5a*) exceeds an "exciting voltage" (FIG. 2), transistors (21, 28 and 33) turn ON, and a transistor (30) turns OFF, and then a tripping winding 16 is excited to close a circuit breaker; on the other hand when the voltage (V) is lowered under a "tripping voltage", the transistor (33) turns OFF and the transistor (30) turns ON, and thereby a load resistor (31) which is less than a resistance 34 of the tripping winding 16 is connected to the D.C. power source; consequently, the voltage V is further lowered by the internal resistance (5*a*), and a voltage difference is produced between the exciting voltage and the tripping voltage, thus making a "hysteresis characteristic" between the exciting voltage and the tripping voltage.

2 Claims, 3 Drawing Sheets

Solid line: Voltage across terminals (7) and (8)
Dotted line: Voltage across terminals (7) and (35)

TRIP CONTROL APPARATUS OF CIRCUIT BREAKER

FIELD OF THE INVENTION AND RELATED ART STATEMENT

1. Field of the Invention

The present invention relates generally to a circuit breaker, and more particularly to a trip control apparatus for a circuit breaker.

2. Description of the Related Art

FIG. 3 shows circuitry for a trip control apparatus, as disclosed in the Japanese Published Unexamined Utility Model Application Sho 57-1041, of a circuit breaker for tripping the circuit breaker when a voltage of a power source is lowered under a predetermined value. Referring to FIG. 3, terminals 2 and 3 of a primary winding of a transformer 5 are coupled to an A.C. power source 4. A secondary output of the transformer 5 is rectified by a full wave rectifier 6. A filter capacitor 9 is connected across a positive terminal 7 and a negative terminal 8 of the full wave rectifier 6. A transistor 11 is coupled at the base, through a series connection of a Zener diode 12 and a resistor 13, to the positive terminal 7. The collector of the transistor 11 is coupled to the positive terminal 7 through an opposite-poled diode, whereacross a tripping winding 16 is connected. The emitter of the transistor 11 is coupled to the negative terminal 8. The diode 10 serves to protect the transistor 11 from a counter-electromotive force of the tripping winding 16.

An output D.C. voltage V of the full wave rectifier 6 is applied to the base of the transistor 11 through the resistor 13 and the Zener diode 12. When the voltage V is substantially higher than a Zener voltage of the Zener diode 12, a base current flows and the transistor 11 turns ON. Consequently, the tripping winding 16 is excited, and a circuit breaker (not shown) which is activated by the tripping winding 16 is closed. The voltage across the terminals 2 and 3 in the above-mentioned state is designated as an "exciting voltage".

When the voltage V is lowered under the Zener voltage of the Zener diode 12 by drop of the voltage of the alternating power source 4, the transistor 11 turns OFF, and the tripping winding 16 is not excited. As a result, the circuit breaker (not shown) is tripped. A voltage across the terminals 2 and 3 in the above-mentioned state is designated as a "tripping voltage".

In the trip control apparatus of the circuit breaker in the prior art, the tripping voltage depends on the Zener voltage of the Zener diode 12 and a magnetic characteristic of the tripping winding 16. Therefore, in order to change the tripping voltage, the Zener diode 12 must be exchanged with another Zener diode having a different Zener voltage, or the tripping winding 16 must be exchanged with another tripping winding of different magnetic characteristic; and thus many kinds of the Zener diodes 12 or the tripping coils 16 must be prepared to obtain various exciting voltages and tripping voltages.

Moreover, when the output voltage of the full wave rectifier 6 is reduced below the Zener voltage of the Zener diode 12 by reduction of the voltage of the power source 4, an electric charge of the capacitor 9 starts to be discharged, and thereby the voltage across the terminals 7 and 8 does not rapidly fall down. Therefore, the transistor 11 remains ON during a time period which is proportional to the capacitance of the capacitor 9. Consequently, a time-lag from the fall down of the voltage of the power source 4 and tripping operation of the circuit breaker is produced. In order to shorten the time-lag, the capacitance of the capacitor 9 must be decreased. However, a ripple factor in the output voltage of the full wave rectifier 6 increases by decrease of the capacitance, and when the voltage across the terminals 7 and 8 is close to the Zener voltage of the Zener diode 12, operation of the circuit breaker becomes unstable.

OBJECT AND SUMMARY OF THE INVENTION

An object of the present invention is to provide a trip control apparatus for a circuit breaker which is stable in operation.

The trip control apparatus of the circuit breaker in accordance with the present invention comprises:

voltage detecting means for issuing an output signal in a voltage range above a predetermined voltage of a D.C. power source having an internal resistance, first switch means to be closed by the output signal of the voltage detecting means, a load resistance to be connected to the D.C. power source by closing of the first switch means second switch means to be closed by opening of the first switch means and to be opened by closing of the first switch means, and a tripping winding of the circuit breaker having a resistance larger than the load resistance and to be connected to the D.C. power source by closing of the second switch means.

DESCRIPTION OF THE PREFERRED EMBODIMENT

Figure 1:
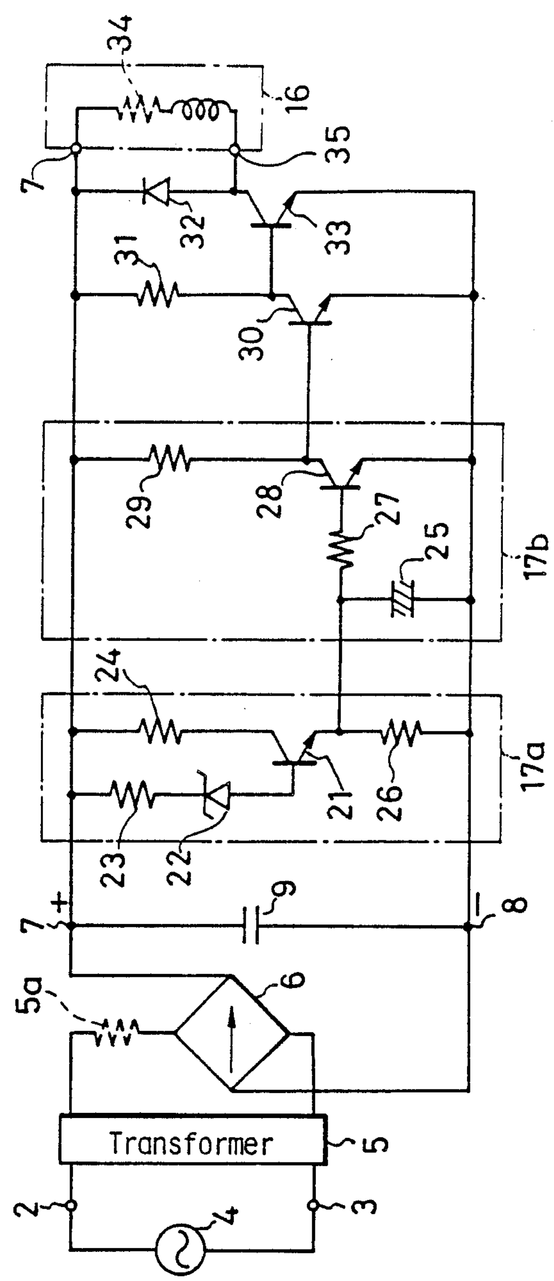
FIG. 1 is a circuitry of a trip control apparatus of a circuit breaker of an embodiment in accordance with the present invention.

FIG. 1 is a circuitry of an embodiment of a trip control apparatus of a circuit breaker in accordance with the present invention. Referring to FIG. 1, terminals 2 and 3 of a primary winding of a transformer 5 are coupled to an A.C. power source 4. Both terminals of a secondary winding of the transformer 5 are coupled to a full wave rectifier 6. A D.C. output of the rectifier 6 is output across a positive terminal 7 and a negative terminal 8. A filter capacitor 9 is coupled across the terminals 7 and 8. The secondary winding has an internal resistance, and a substantial internal resistance **5*a* of the D.C. power source is formed by the resistances of the secondary winding and the full wave rectifier 6. A transistor 21 is coupled to the terminal 7 at the collector through a resistor 24, and the emitter is coupled to the terminal 8 through a resistor 26. The base of the transistor 21 is coupled to the terminal 7 through a series connected Zener diode 22 and a resistor 23. A voltage detecting circuit 17*a* is formed by the transistor 21, the resistors 23 and 26 and the Zener diode 22**.

A transistor 28 is coupled to the terminal 7 at the collector through a resistor 29, and at the emitter to the terminal 8. The base of the transistor 28 is coupled to the emitter of the transistor 21 through a resistor 27. A capacitor 25 is connected in parallel to the resistor 26. A voltage holding circuit **17*b* comprises by the transistor 28, the resistors 27 and 29 and the capacitor 25**.

The collector of the transistor 28 is coupled to the base of a transistor 30, which is a first switch means. The transistor 30 is coupled at the emitter to the terminal 8 and is coupled at the collector to the terminal 7 through a load resistor 31. The resistance of the load resistor 31 is made to be lower than that of an internal resistor 34 of a tripping coil 16. The collector of the transistor 30 is coupled to the base of the transistor 33 which is a second switch means. Moreover, the transistor 33 is coupled at the emitter to the terminal 8 and is coupled at the collector to the terminal 7 through the tripping coil 16. A diode 32 is quenching a counter-electromotive voltage which is induced by the tripping coil 16 in tripping operation of the tripping control apparatus.

Operation of the embodiment is elucidated hereafter. A voltage of the A.C. power source is transformed to a lower voltage by the transformer 5 and is applied to the full wave rectifier 6. The DC current voltage of the full wave rectifier 6 is output across the positive terminal 7 and the negative terminal 8. A ripple component of current of the full wave rectifier 6 is filtered by the capacitor 9. The D.C. voltage across the terminals 7 and 8 is applied to the Zener diode 22 through the resistors 23 and 26 and the base-emitter junction of the transistor 21. A voltage which is applied to the Zener diode 22 is in proportion to the voltage of the A.C. power source 4.

Figure 2:
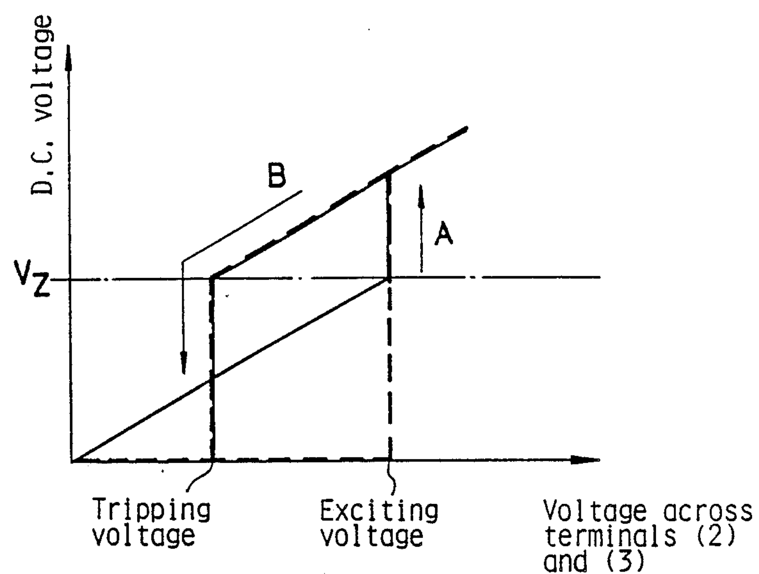
FIG. 2 is a graph showing operation of the embodiment.
Figure 3:
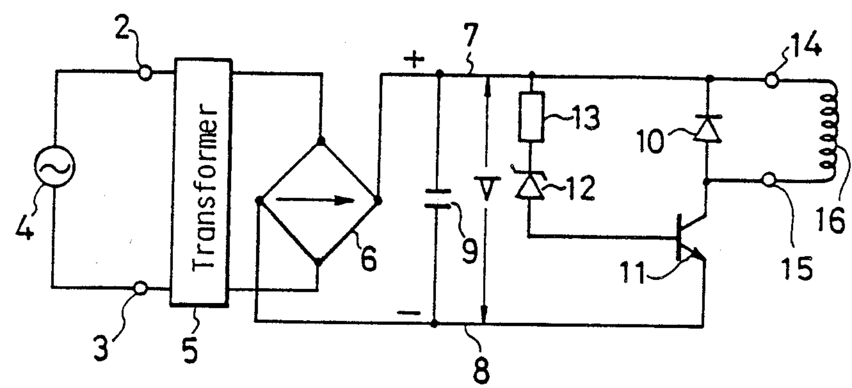
FIG. 3 is the circuitry of the trip control apparatus of the circuit breaker in the prior art.

FIG. 2 is a graph showing a relation of the voltage of the A.C. power source 4 versus a voltage across the terminals 7 and 35 of the tripping coil 16. Referring to the graph, the voltage across the terminals 7 and 8 is shown by a solid line, and the voltage across the terminals 7 and 35 is shown by a dotted line.

When the voltage of the A.C. power source 4 gradually rises, in a range of the voltage wherein the voltage applied to the Zener diode 22 is lower than the Zener voltage of the Zener diode 22, the transistors 21, 28 and 33 remain OFF, and the transistor 30 remains ON. When the voltage applied to the Zener diode 22 exceeds the Zener voltage Vz, the base current of the transistor 21 flows, an the transistor 21 turns ON. Consequently, the transistor 28 and 33 turns ON, and the transistor 30 turns OFF. Thus, the tripping coil 16 is excited. A voltage of the A.C. power source 4 in the above-mentioned state is designated as an "exciting voltage". Since the resistance of the load resistor 31 is selected to be lower than that of the resistor 34 of the tripping winding 16, the output current of the A.C. power source 4 is reduced by turn-OFF of the transistor 30 and turn-ON of the transistor 33. Consequently, a voltage drop by the internal resistance **5*a* is reduced, and the voltage across the terminals 7 and 8 rises. The above-mentioned state is shown by an arrow A in FIG. 2. Referring to FIG. 2, the voltage across the terminals 7 and 8 rapidly rises at the exciting voltage, and the voltage across the terminals 7 and 35 of the tripping coil 16 also rises to a voltage which is almost equal to the voltage across the terminals 7 and 8**.

On the other hand, when the voltage of the A.C. power source 4 is gradually lowered in exciting state of the tripping winding 16, as shown in FIG. 2, the voltage across the terminals 7 and 8 is lowered as shown by an arrow B. When a voltage applied to the Zener diode 22 falls under the Zener voltage Vz, the base current of the transistor 21 is shut off. Consequently, the transistors 21, 28 and 33 turn OFF, and excitation of the tripping winding 16 is released. Since the transistor 30 turns ON, a comparatively large current flow through the load resistor 31 and the transistor 30. Thus the voltage across the terminals 7 and 8 is lowered. The voltage of the A.C. power source 4 in the above-mentioned state is designated as a "tripping voltage". The exciting voltage is higher than the tripping voltage as shown in FIG. 2. In other words, a hysteresis characteristic is formed between the exciting voltage and the tripping voltage.

In FIG. 1, the capacitor 9 serves to smooth the pulsating current of the full wave rectifier 6 and to moderate rapid variation of the voltage of the A.C. power source 4. As a result, there is a time-lag from the voltage rise of the A.C. power source 4 to the turn-ON of the transistor 21 or voltage fall of the A.C. power source 4 and turn-OFF of the transistor 21. In order to shorten the time-lag, the capacitance of the capacitor 9 must be reduced.

According to the present invention, the load resistance 31 which is lower in resistance than the internal resistance 34 of the tripping winding 16 is connected in parallel to the D.C. power source of the full wave rectifier 6, and when the voltage of the A.C. power source 4 is changed, the load resistor 31 or the tripping winding 16 is alternatively connected to the D.C. power source. Consequently, the hysteresis characteristic is formed in the voltage detecting operation of the voltage detecting means **17*a*, and the exciting voltage can be varied by change of the load resistor 31. Thus a difference between the exciting voltage and the tripping voltage can be arbitrarily selected by change of the resistance of the load resistor 31. Accordingly, reliable operation of the trip control apparatus is realized even if a capacitor of small capacitance is used as the filter capacitor 9. Moreover, in the embodiment, the capacitor 25 of the voltage holding circuit 17*b*** also serves as a filter capacitor.

In the above-mentioned embodiment, the elucidation is made for the case using the A.C. power source 4. In a case of using a D.C. power source, a similar operation is realized by supplying the D.C. voltage to the terminals 7 and 8.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A trip control apparatus of a circuit breaker comprising:

voltage detecting means for issuing an output signal in a voltage range above a predetermined voltage of a D.C. power source having an internal resistance, first switch means to be closed by said output signal of said voltage detecting means, a load resistance to be connected to said D.C. Power source by closing of said first switch means second switch means to be closed by opening of said first switch means and to be opened by closing of said first switch means, and a tripping coil of said circuit breaker having a resistance larger than said load resistance and to be connected to said D.C. power source by closing of said second switch means.

2. A trip control apparatus as claimed in claim 1, wherein said first switch means and load resistance are arranged in series with each other, wherein said second switch means and tripping coil are arranged in series with each other, and wherein the series combination of the first switch means and load resistance is arranged in parallel with the series combination of the second switch means and the tripping coil.

* * * * *